(12) United States Patent
Kent

(10) Patent No.: US 11,261,595 B2
(45) Date of Patent: *Mar. 1, 2022

(54) HYDRODYNAMIC SEPARATOR FOR STORMWATER TREATMENT

(71) Applicant: Bio Clean Environmental Services, Inc., Oceanside, CA (US)

(72) Inventor: Zachariha J. Kent, Fair Oaks Ranch, TX (US)

(73) Assignee: Bio Clean Environmental Services, Inc., Oceanside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,275

(22) Filed: Jul. 8, 2019

(65) Prior Publication Data

US 2019/0330836 A1    Oct. 31, 2019

Related U.S. Application Data

(63) Continuation of application No. 15/700,149, filed on Sep. 10, 2017, now Pat. No. 10,344,466.

(51) Int. Cl.
*E03F 5/14* (2006.01)
*B01D 21/00* (2006.01)
*B01D 21/24* (2006.01)
*B01D 17/02* (2006.01)

(52) U.S. Cl.
CPC ............ *E03F 5/14* (2013.01); *B01D 17/0211* (2013.01); *B01D 21/0003* (2013.01); *B01D 21/0006* (2013.01); *B01D 21/0012* (2013.01); *B01D 21/0024* (2013.01); *B01D 21/0039* (2013.01); *B01D 21/0042* (2013.01); *B01D 21/0087* (2013.01); *B01D 21/245* (2013.01); *B01D 21/2405* (2013.01); *B01D 21/2433* (2013.01); *B01D 21/2444* (2013.01); *B01D 2221/12* (2013.01)

(58) Field of Classification Search
CPC .......... E03F 5/14; E03F 5/16; B01D 17/0211; B01D 21/0024; B01D 21/003; B01D 21/0039; B01D 21/0042; B01D 21/0087; B01D 21/2405; B01D 21/2444; B01D 2221/12; C02F 2103/001
USPC ....... 210/170.03, 519, 521, 532.1, 538, 540, 210/747.2, 801
See application file for complete search history.

(56) References Cited

U.S. PATENT DOCUMENTS

| | | | | |
|---|---|---|---|---|
| 911,314 | A | * 2/1909 | Maranville | ........ B01D 17/0208 210/540 |
| 1,793,599 | A | * 2/1931 | Egan | ........................ E03F 5/046 210/170.03 |
| 3,529,728 | A | * 9/1970 | Middelbeek | ....... B01D 17/0211 210/522 |
| 5,498,331 | A | * 3/1996 | Monteith | ................... E03F 5/16 210/170.03 |
| 5,849,181 | A | * 12/1998 | Monteith | ........... B01D 17/0211 210/532.1 |

(Continued)

*Primary Examiner* — Christopher Upton
(74) *Attorney, Agent, or Firm* — Steven W. Webb

(57) ABSTRACT

A method, system, and apparatus directed to an innovative approach for the treatment of stormwater utilizing hydrodynamic separator assembly designed to maximize flow movement for more efficient sediment removal and maximize clearance space within assembly to facilitate cleaning and increase storage capacity of trash, debris, and sediment.

36 Claims, 11 Drawing Sheets

(56) References Cited

U.S. PATENT DOCUMENTS

| | | | | |
|---|---|---|---|---|
| 6,062,767 A * | 5/2000 | Kizhnerman | ............. | E03F 5/16 |
| | | | | 210/170.03 |
| 6,068,765 A * | 5/2000 | Monteith | ........... | B01D 21/0036 |
| | | | | 210/170.03 |
| 6,077,448 A * | 6/2000 | Tran-Quoc-Nam | ...... | E03F 5/14 |
| | | | | 210/532.1 |
| 8,142,666 B1 * | 3/2012 | Happel | ..................... | E03F 5/14 |
| | | | | 210/747.2 |
| 8,663,466 B2 * | 3/2014 | Braunwarth | ............. | E03F 5/14 |
| | | | | 210/170.03 |
| 10,202,285 B1 * | 2/2019 | Happel | ..................... | E03F 5/14 |
| 10,344,466 B2 * | 7/2019 | Kent | ........................ | E03F 5/14 |
| 2009/0020466 A1 * | 1/2009 | Williams | ................. | E03F 5/14 |
| | | | | 210/170.03 |
| 2012/0031851 A1 * | 2/2012 | Gulliver | .................... | E03F 5/14 |
| | | | | 210/170.03 |
| 2015/0345523 A1 * | 12/2015 | Hoff | ......................... | E03F 5/14 |
| | | | | 210/170.03 |
| 2017/0342698 A1 * | 11/2017 | Fink | ......................... | E03F 5/14 |

\* cited by examiner

HYDRODYNAMIC SEPARATOR FOR STORMWATER TREATMENT

CROSS-REFERENCE TO RELATED APPLICATION

The present application is a Continuation of U.S. patent application Ser. No. 15/700,149, filed on Sep. 10, 2017, now U.S. Pat. No. 10,344,466 issued on Jul. 9, 2019.

FIELD OF THE INVENTION

The embodiments of the present technology relate in general to an advanced sediment removal devices based on principles of hydrodynamic and gravity separation. More specifically, a hydrodynamic separator to remove sediments and other pollutants from polluted stormwater runoff and polluted water sources. The hydrodynamic separator is designed to reduce velocity and maximize flow path within a settling chamber of minimal size to maximize performance and feasibility. The hydrodynamic separator is generally installed subsurface within the drainage infrastructure of various private and public drainage systems.

BACKGROUND AND PRIOR ART

Water treatment systems have been in existence for many years. These systems treat stormwater surface runoff or other polluted water. Stormwater runoff is of concern for two main reasons: i. volume and flow rate, and ii. pollution and contamination. The volume and flow rate of stormwater runoff is a concern because large volumes and high flow rates can cause erosion and flooding. Pollution and contamination of stormwater runoff is a concern because stormwater runoff flows into our rivers, streams, lakes, wetlands, and/or oceans. Pollution and contamination carried by stormwater runoff into such bodies of water can have significant adverse effects on the health of ecosystems.

The Clean Water Act of 1972 enacted laws to improve water infrastructure and quality. Sources of water pollution have been divided into two categories: point source and non-point source. Point sources include wastewater and industrial waste. Point sources are readily identifiable, and direct measures can be taken to mitigate them. Non-point sources are more difficult to identify. Stormwater runoff is the major contributor to non-point source pollution. Studies have revealed that contaminated stormwater runoff is the leading cause of pollution to our waterways. As we build houses, buildings, parking lots, roads, and other impervious areas, we increase the amount of water that runs into our stormwater conveyance systems and eventually flows into rivers, lakes, streams, wetlands, and/or oceans. As more land becomes impervious, less rain seeps into the ground, resulting in less groundwater recharge and higher velocity flows, which cause erosion and increased pollution levels of watery environments.

Numerous sources introduce pollutants into stormwater runoff Sediments from hillsides and other natural areas exposed during construction and other human activities are one source of such pollutants. When land is stripped of vegetation, stormwater runoff erodes the exposed land and carries it into storm drains. Trash and other debris dropped on the ground are also carried into storm drains by stormwater runoff. Another source of pollutants is leaves and grass clippings from landscaping activities that accumulate on hardscape areas and do not decompose back into the ground, but flow into storm drains and collect in huge amounts in lakes and streams. These organic substances leach out large amounts of nutrients as they decompose and cause large algae blooms, which deplete dissolved oxygen levels in marine environments and result in expansive marine dead zones. Unnatural stormwater polluting nutrients include nitrogen, phosphorus, and ammonia that come from residential and agricultural fertilizers.

Heavy metals that come from numerous sources are harmful to fish, wildlife, and humans. Many of our waterways are no longer safe for swimming or fishing due to heavy metals introduced by stormwater runoff. Heavy metals include zinc, copper, lead, mercury, cadmium and selenium. These metals come from vehicle tires and brake pads, paints, galvanized roofs and fences, industrial activities, mining, recycling centers, etc. Hydrocarbons are also of concern and include oils, gas, and grease. These pollutants come from leaky vehicles and other heavy equipment that use hydraulic fluid, brake fluid, diesel, gasoline, motor oil, and other hydrocarbon based fluids. Bacteria and pesticides are additional harmful pollutants carried into waterways by stormwater runoff.

Over the last 20 years, the Environmental Protection Agency (EPA) has been monitoring the pollutant concentrations in most streams, rivers, and lakes in the United States. Over 50% of waterways in the United States are impaired by one of more of the above-mentioned pollutants. As part of the EPA Phase 1 and Phase 2 National Pollutant Discharge Elimination Systems, permitting requirements intended to control industrial and nonindustrial development activities have been implemented. Phase 1 was initiated in 1997 and Phase 2 was initiated in 2003. While there are many requirements for these permits, the main requirements focus on pollution source control, pollution control during construction, and post construction pollution control. Post construction control mandates that any new land development or redevelopment activities incorporate methods and solutions that both control increased flows of surface water runoff from the site and decrease (filter out) the concentration of pollutants off the site. These requirements are commonly known as quantity and quality control. Another part of these requirements is for existing publicly owned developed areas to retrofit the existing drainage infrastructure with quality and quantity control methods and technologies that decrease the amount of surface water runoff and pollutant concentrations therein.

One approach to treat stormwater known in the art is separation or sedimentation of materials that are not neutrally buoyant, as an example, particles that are heavier and trash and oils that are lighter. Stormwater treatment devices that provide this method of treatment are called hydrodynamic separators. A hydrodynamic separator, or settling hydrodynamic separator, controls the flow of water by reducing incoming velocities and maximizing flow of the flow path which allows trash, debris, and total suspended solids (TSS), floatables and oils to settle out of the stormwater and remain contained within the hydrodynamic separator for later removal.

SUMMARY OF THE INVENTION

The present invention accomplishes the above listed objectives by using a uniquely designed hydrodynamic separator including a flow splitter which redirects the flow of water upon entering the sump chamber from the inlet pipe. The flow splitter in combination with the oil-floatables skimmer minimizes the velocity of inflowing water and redirects it away from the center of the structure, which is generally round, and then along the structure's perimeter walls in two directions. Water flows along the walls and toward the oil-floatables skimmer on both sides. As these flows come in contact with the skimmer the flows continue along the skimmer wall back toward the center where the two flow paths flow into each other. At this point the flow paths are forced back toward the inlet from which they came. The two flow paths make a complete circle on the influent side of the oil-floatables skimmer. This creates a dual swirl action within the system and maximizes the flow path while keeping velocities low within the hydrodynamic separator, allowing for efficient capture and retention of trash, debris, and total suspended solids (TSS). Directing flows, containing sediments, especially finer sediment, back under the inlet which is as far away from the outlet as possible maximizes the ability of the system to capture and retain the finer sediments.

The outlet weir also plays a significant role in the system's performance. As with inlet velocities, outlet or exit velocities can also have a major impact on a systems overall effectiveness. During product development, different configurations were tested such as without an outlet weir, a shorter outlet weir and a taller outlet weir. A 6-inch tall outlet weir, measured from the outlet pipe invert proved to provide optimal performance. All weir configurations proved to be more effective than no outlet weir. In general, as water exits a structure and back into a pipe the velocity from the structure to the pipe quickly increases due the contraction of area into the pipe. This contraction creates a vacuum effect within the structure and can pull sediments out of the system that would have settled given more time and a condition of less velocity. To overcome this challenge, an outlet weir is placed across the outlet pipe. The outlet weir width is maximized within the system in order to spread the flow over it evenly. Because of the width of the weir is substantially wider than the pipe, the velocity of flow over the weir is minimized in a laminar fashion. This in turn increases the time particulates have to settle out on the effluent side of the oil-floatables skimmer. The weir also raises the water level in the system thus increasing the volume of water. The greater the volume of water within the system the more retention time. Studies have shown increased retention time also increases performance in particulate removal.

The present invention solves well know problems in the art such as short circuiting, minimal flow paths, minimal velocity reductions, inability to capture and retain finer sediments, floatables and oils/hydrocarbons. Other systems that employ velocity reduction and flow path maximization techniques do so without splitting the flow in two separate directions. This singular flow path has limited effectiveness as the velocity can only be reduced by the width of the structure in relation to inlet velocity. For example, a 2-foot pipe entering a 4-foot wide hydrodynamic separator can only reduce the velocity by half its inlet rate if flow distribution is perfectly even, which is known as laminar flow. A system that maximizes the flow path by directing all flows in one direction does not reduce the velocity of inflowing water thus minimizing its ability to capture finer particulates. Since the present invention splits the influent flow velocity in half its performance in capturing finer particulates is increased.

Another problem with other systems is the amount of flow path maximization. Generally, the inlet pipe is on the opposite side of the cylindrical structure from the outlet pipe. As water is directed along one wall it travels half the circumference of structures perimeter before nearing the outlet. The present invention directs flows back towards the inlet side of the system. The flow then will have to still travel, at a lower elevation in the system, back along the perimeter walls of the structure along both sides back towards the outlet. Thus, water must travel in two full revolutions before nearing the outlet, one again maximizing flow path while keeping velocities minimized.

Maintenance access is a major concern which is related to the design of the system. Other systems have very limited access to the sump chamber where sediment is collected. These systems generally need to be maintained by finish surface without access into the system. Entry into the system requires confined space which adds a lot of time and cost to the required maintenance. Other systems have horizontally extending decks below the inlet and outlet that extend across the majority of the area of the cylindrical structure. This makes access to the sump chamber below limited. Most other systems have a single access port near the center of the structure for the insertion of the vacuum hose to remove captured sediments and other pollutants. For example, one system marketed under the name StormCeptor, has a system with a 6-foot diameter structure yet only a 1-foot diameter maintenance access port. Other systems have similar configurations. A few have access that is almost half the area (50%) of the structure which is industry leading. The design of the present invention allows for more than 70% unimpeded access to the sump chamber below. This allows for easy visual observation, from finish surface, to the sump chamber below to measure and ensure all sediments have been removed. Other systems cannot be visually inspected and because access into the sump chamber below is so restricted that only a portion of the sediment captured is ever removed. Generally, the sediment will be evenly distributed on the floor of the sump chamber. If the vacuum hose can only be inserted through a small port in the middle, there is no way for it to remove all the sediment not located directly under the access port. Several reports have verified that the sediment captured in hydrodynamic separators will become compacted and hard after being stored for several months. Because a majority of the sediments cannot be removed from other separators, its sediment storage capacity after initial installation is severely reduced. As such the required maintenance interval on these systems is drastically increased which increases the cost and frequency to maintain these systems.

Unlike other hydrodynamic separators known in the art, the presented invention is an innovative method utilizing the combination of the flow splitter, oil-floatables skimmer and outlet weir. The sump chamber has minimum obstructions which include only the flow splitter, an oil-floatables skimmer, and an outlet weir. The simplicity of a design with few parts provides a sustainable solution by reducing the amount of materials required for the hydrodynamic separator to function optimally. Fewer materials and parts reduce the cost of production.

A preferred embodiment of installation of the hydrodynamic separator is within a drainage infrastructure as it can easily be installed inline with existing pipes.

The hydrodynamic separator can range in size from 2 feet in diameter up to 100 feet in diameter but generally ranges from 4 feet to 14 feet in diameter.

In some embodiments, more than one inlet and outlet pipe may be integrated into the hydrodynamic separator at different angles to allow for installation in various storm drain pipe arrangements.

The hydrodynamic separator is capable of greater than 80% removal of total suspended solids based on a typical particle size distribution found in stormwater runoff by maximizing the flow path and thereby significantly reducing the velocity of stormwater through the hydrodynamic separator. Notably, trash, debris and floatables are not trapped in the flow splitter as it enters the sump chamber from the inlet pipe because the flow splitter has openings on both sides, allowing for stormwater and floatables to transition to the open area on the influent side of the oil-floatables skimmer. Stormwater is further treated by the oil-floatables skimmer, which due to the slowed velocity, results in up to ninety-nine percent retention of free floating oils and grease.

During periods of high flow, the hydrodynamic separator will continue to treat the incoming stormwater. The flow splitter height is designed to split incoming flows up to a certain flow rate. At higher flow rates the water may pass over the top of the flow splitter's walls to reduce head loss. The oil-floatables skimmer is designed at a height with its top above the highest possible water level, hydraulic grade line, so that no floatables or oils captured will be lost during these high flows. All flows must pass under the oil-floatables skimmer even during periods of high flow. The outlet weir only extends above the outlet pipe invert to a minimal distance allowing high flows to pass over it without generating significant head loss.

OBJECTIVES OF THE INVENTION

It is an objective of the invention to use flow weirs to direct water flow by impeding normal water flow through a drainage structure.

Further, it is the objective to reduce the rate of velocity through a stormwater treatment system with the weirs by changing the natural direction of the flow path. This allows for significantly increased rates of sediment precipitation.

In preferred embodiments, it is an objective of the invention to utilize flow weirs of at least one flow splitter, oil-floatables skimmer and at least one outlet weir where water is treated by each of these flow weirs to remove fine sediment, oils and grease, trash and other debris.

It is the objective of this invention to use a flow splitter near the inlet pipe to create a swirling flow path on the inlet side of the oil skimmer to drastically reduce velocity and extend flow path length.

It is the objective of this invention to use an outlet weir to create laminar flow over the weir to again reduce the velocity of the water for further settling before it exits the outlet pipe.

It is the objective of this invention to maximize access to the floor of the hydrodynamic separator to facilitate cleaning.

DETAILED DESCRIPTION OF THE INVENTION

Figure 1:
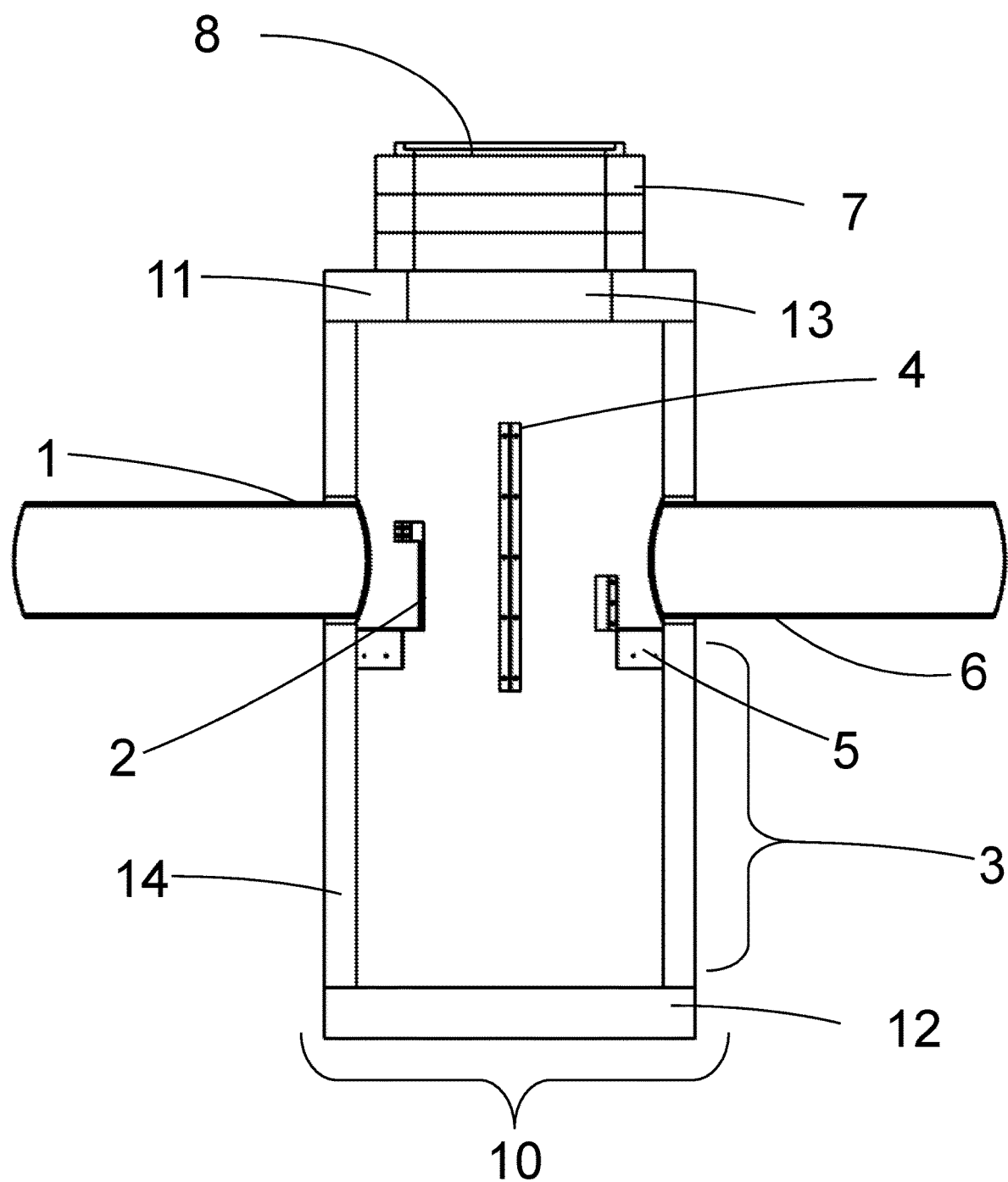
FIG. 1. Illustrates a side-view, cut-out schematic of the hydrodynamic separator, in accordance with one embodiment.

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

The present invention provides an improved hydrodynamic separator 10 for stormwater treatment designed to maximize flow movement for more efficient sediment removal from stormwater and to maximize clearance space within the sump chamber to facilitate cleaning and increase storage capacity of trash, debris, and sediment.

In some embodiments, configurations of said invention can be customized depending on site needs, government regulations, and consumer preference. The hydrodynamic separator utilizes flow weirs to maximize flow movement and slow water flow rate within the hydrodynamic separator. The interchange of the type and number of weirs depends on the configuration installed. Flow weirs may be selected from a group consisting of: flow splitter(s), oil-floatables skimmer, sediment baffles, v-notch weirs, outlet weir(s) or other weirs that alter flow characteristics of water through the hydrodynamic separator. Other flow weirs, including bypass weirs and low flow diversion weirs, for example, have been contemplated at the time of invention and may be included and/or substituted in the invention to manage water velocity and improve sediment and floatable trash and debris removal. The flow weirs merely serve to support the primary functions of the invention without equating to an overall change in the function and purpose of the hydrodynamic separator.

In a preferred embodiment, the hydrodynamic separator is a substantially circular or alternatively a cylindrical chamber. Alternate embodiments of the hydrodynamic separator may allow for non-uniform configurations, for example a bowed shape, squares or rectangles. The hydrodynamic separator comprises a top 11 and the top having one or more openings 13 which can be covered via an access riser(s) 7 and/or manhole covers 8 and a solid bottom 12. The hydrodynamic separator 10 has at least one inlet pipe 1 and one outlet pipe 6 located above the sump chamber 3. The sump chamber 3 is defined as the area below the inlet pipe invert within the hydrodynamic separator 10 which holds water and allows for separation.

Within the hydrodynamic separator 10, adjacent to the inlet pipe 1 and outlet pipe 6, there are three removably mounted flow weirs affixed to the hydrodynamic separator's 10 sides walls 14. These flow weirs serve to alter the flow of stormwater through the hydrodynamic separator 10 to enhance performance in removing sediments, particulates, trash, and oils. In preferred embodiments, the flow weirs are selected from a group consisting of: a flow splitter 2, an oil-floatables skimmer 4, and an outlet weir 5.

The flow path between the flow splitter 2 to the oil-floatables skimmer 4 is maximized by splitting and slowing the influent flows from the inlet pipe 1 and directing the flows along the hydrodynamic separator walls 14 toward the oil-floatables skimmer 4 at the point where the oil-floatables skimmer 4 connects to the hydrodynamic separator chamber walls 14 and inward along oil-floatables skimmer 4 toward the center of the sump chamber 3 where the flows that were split meet back up and are pushed back toward the flow splitter 2 and inlet pipe 1 from which it came thus maximizing the flow path by taking it in a full circle in two split and opposite directions. This flow path between the flow splitter 2, oil skimmer 4, and the inlet pipe 1 can be traced via the arrows of the swirling flow from the inlet on the surface 30.

The oil-floatables skimmer 4, which is operative to isolate hydrocarbons from water for later removal, further serves as a barrier preventing floatable trash and large floatable debris from moving from the inlet pipe 1 side of the sump chamber 3 to the outlet pipe 6 side of the sump chamber 3 as water must pass under the oil-floatables skimmer 4. Since the oil-floatables skimmer 4 is connected to the hydrodynamic separator's walls 14 at its widest point the flow under the oil-floatables skimmer 4 is laminar thereby minimizing velocities and providing greater time for settling of particulate matter such as sediments and retaining floatables which are stored on the inlet pipe 1 side of the sump chamber 3 until the sump chamber 3 is accessed via the manhole cover 8, access riser 7 and through the top opening 13 for cleaning, using, in some embodiments, a vacuum hose 9. The oil-floatables skimmer 4 has been independently tested by a third-party lab. Their results demonstrate the oil-floatables skimmer 4 installed within the hydrodynamic separator 10 is capable of removing and retaining up to ninety-nine percent of oils and grease (Good Harbour Laboratories, June 2017).

The third component for controlling the flow of water is the outlet weir 5. The outlet weir 5 widens the horizontal plane in which water must flow over to get to the outlet pipe 6. The longer horizontal plane spreads out the flow in a laminar fashion thereby reducing the velocity in the hydrodynamic separator 10 in the area of the sump chamber 3 on the effluent side of the oil-floatables skimmer 4 providing one last opportunity for finer sediment to settle to the bottom of the sump chamber 3 before exiting the hydrodynamic separator 10 via the outlet pipe 6. This flow path over the outlet weir 5 is demonstrated by the arrows depicting laminar flow over the outlet weir 31.

FIG. 1 presents a preferred embodiment contemplated by the inventor at the time of filing wherein the hydrodynamic separator 10 hydrodynamic separator includes the elements of: a top 11, a top opening 13, and a bottom 12, side walls 14, a sump chamber 3 defined as the area in the hydrodynamic separator 10 below an inlet pipe 1, a flow splitter 2, an oil-floatables skimmer 4, an outlet weir 5, an outlet pipe 6, and an access riser 7 and manhole cover 8.

Figure 2:
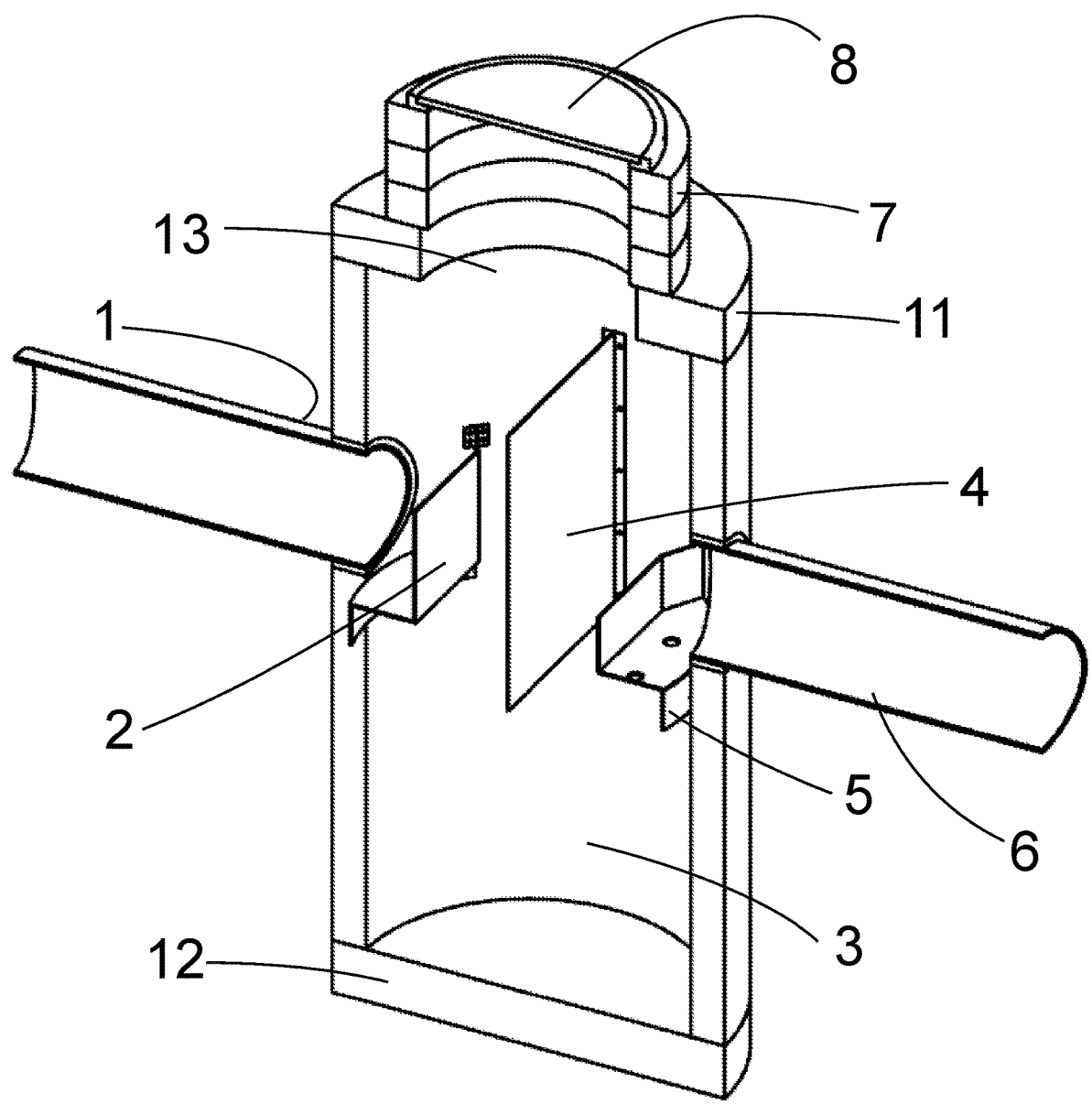
FIG. 2. Illustrates an isometric-view, cut-out schematic of the hydrodynamic separator oriented toward the outlet pipe, in accordance with one embodiment.

FIG. 2 is similar to FIG. 1 with the exception of presenting an orientation towards the outlet pipe 1 to demonstrate a near frontal-view of the flow splitter 2. Other elements of the hydrodynamic separator 10 depicted include: a top 11 and a bottom 12 and top opening 13, a sump chamber 3, an inlet pipe 1, a flow splitter 2, an oil-floatables skimmer 4, an outlet weir 5, an outlet pipe 6, and an access riser 7 and manhole cover 8.

Figure 3:
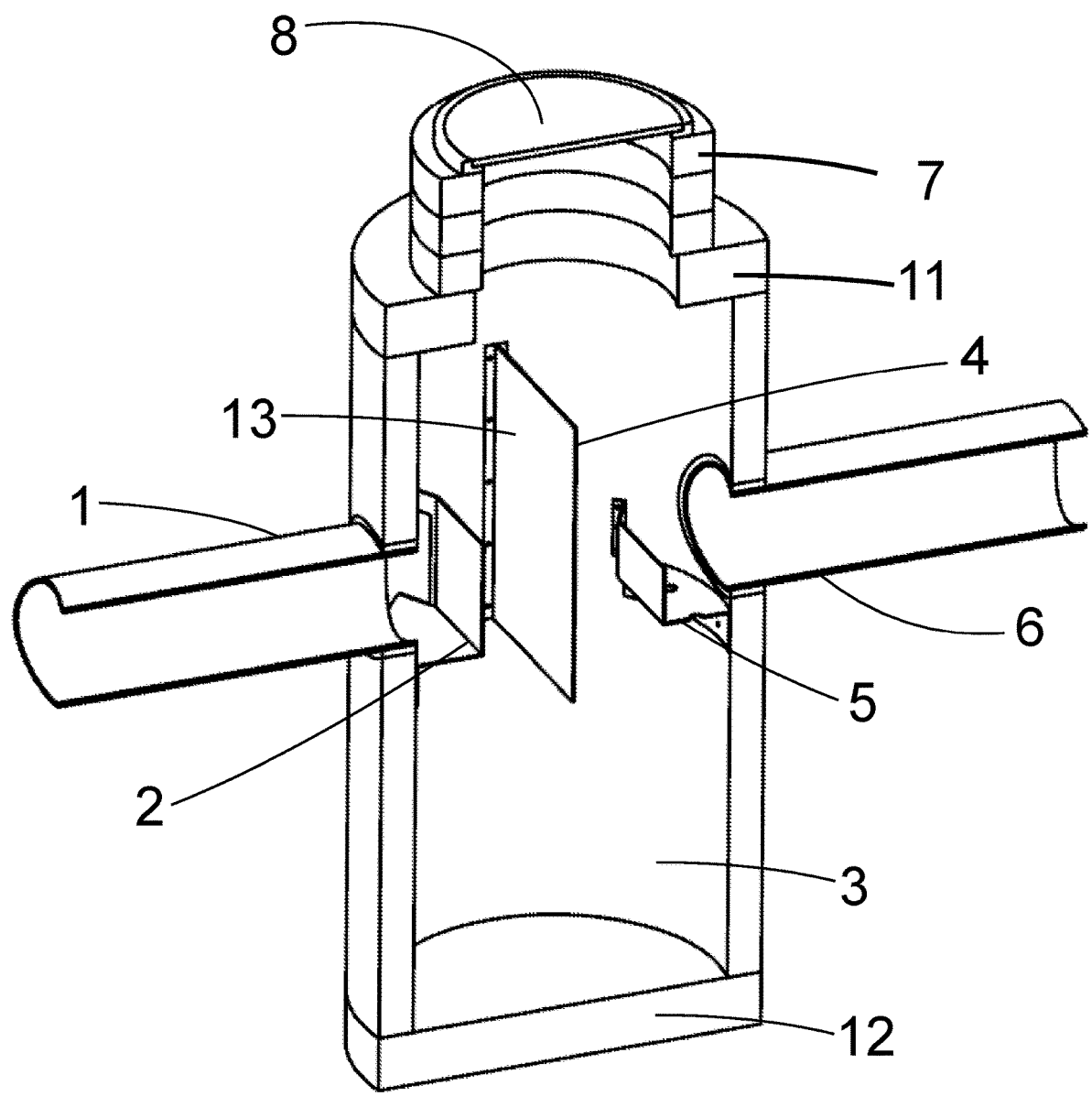
FIG. 3. Illustrates an isometric-view, cut-out schematic of the hydrodynamic separator oriented toward the inlet pipe, in accordance with one embodiment.

FIG. 3 is similar to FIGS. 1 and 2 with the exception of presenting an orientation towards the inlet pipe 6 to demonstrate a near frontal-view of the outlet weir 5. Other elements of the hydrodynamic separator 10 depicted include: a top 11 and a bottom 12 and top opening 13, a sump chamber 3, an inlet pipe 1, a flow splitter 2, an oil-floatables skimmer 4, an outlet weir 5, an outlet pipe 6, and an access riser 7 and manhole cover 8.

Figure 4:
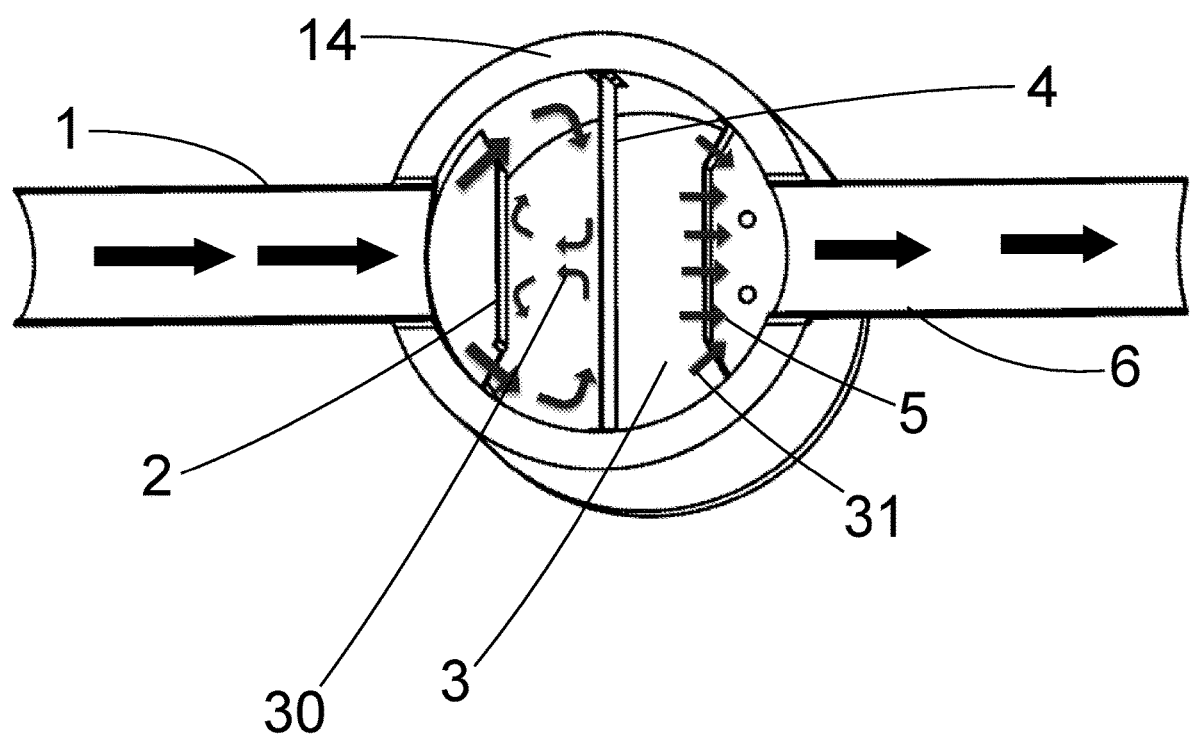
FIG. 4. Illustrates a top-view of the hydrodynamic separator in operation showing the flow path at the surface water level, in accordance with one embodiment.

FIG. 4 is a top-view of the sump chamber 3 in operation, wherein stormwater enters the sump chamber 3 through the inlet pipe 1 where the stream splits into two opposing streams of water once it reaches the flow splitter 2 and is directed along the walls 14 of the hydrodynamic separator toward the oil-floatables skimmer 4. The dual swirls of water travel along the oil-floatables skimmer 4, towards the center of the sump chamber 3 and then back towards the inlet pipe 1 where these streams hit the wall of the flow splitter 15 (best seen in FIG. 7) and are directed back toward the side openings of the flow splitter 16 (best seen in FIG. 7), entering the sump chamber 3 via the inlet pipe 1. This action increases the flow path and it slows the velocity as water moves through the hydrodynamic separator 10 and directs finer sediments that start to settle downward in the water column underneath the inlet pipe 1 below the flow splitter 2. The swirling flow from the inlet on the surface 30 creates slower velocities, thereby allowing for increased settling of finer sedimentation suspended within the stormwater. Removed settlement will collect at the bottom of the sump chamber 3 of the hydrodynamic separator's floor 12 (not show, see FIG. 1).

Figure 8:
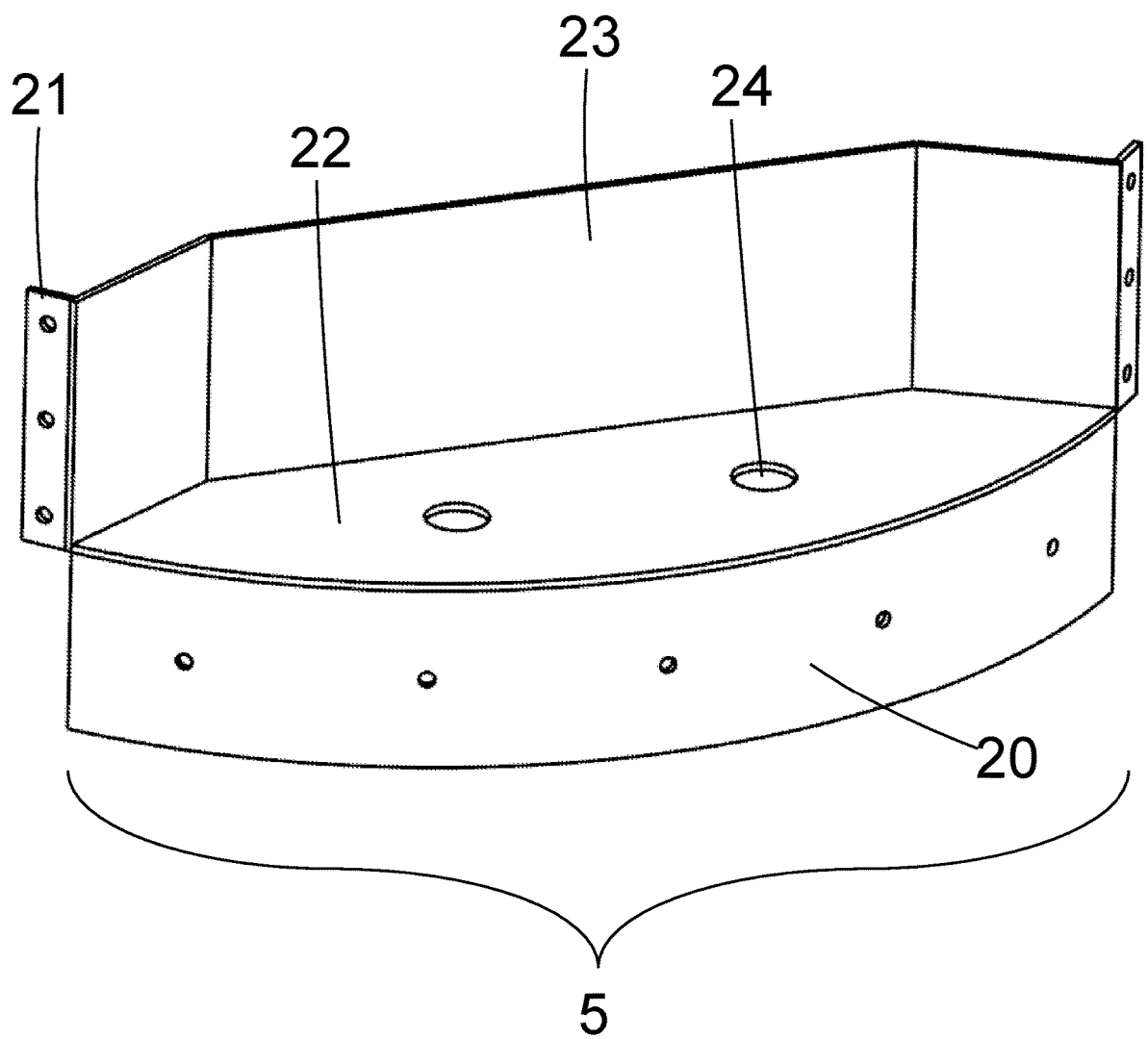
FIG. 8. Illustrates an isometric view of an outlet weir, in accordance with one embodiment.

FIG. 4 also demonstrates the flow of exiting water on the other side of the oil-floatables skimmer 4 wherein treated stormwater travels over the long top horizontal plane of the outlet weir 5 (best viewed in FIG. 8). This flow direction is demonstrated by laminar flow over the outlet weir 31. The top horizontal plane of the outlet weir 5 also serves as a flow dissipation weir to distribute in a laminar fashion to minimize velocity, further slowing the flow, thus allowing for final treatment for fine sediment to settle out before passing up and over the outlet weir 5 to the outlet pipe 6.

Figure 5:
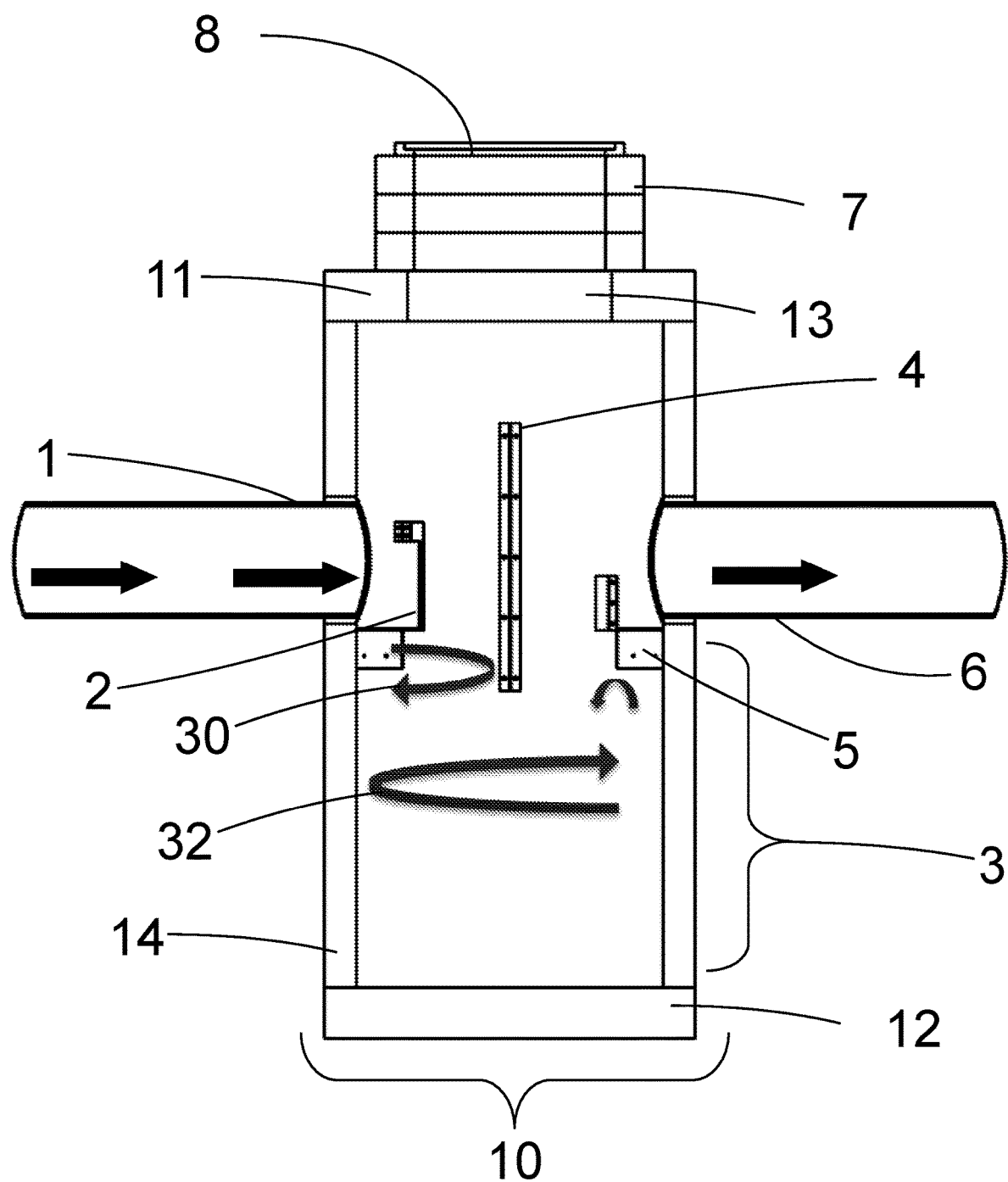
FIG. 5. Illustrates a side-view, cut-out schematic of the hydrodynamic separator in operation showing the flow path at the surface water level and lower portion of the water column, in accordance with one embodiment.

FIG. 5 demonstrates the typical flow path within the hydrodynamic separator hydrodynamic separator 10 from a side view perspective. The principal elements responsible for directing water flow, include the: inlet pipe 1, flow splitter 2, sump chamber 3, oil-floatables skimmer 4, and the outlet weir 5 and the outlet pipe 6. The water flow path begins as a swirling flow from inlet on the surface 30. Then there is a second swirling motion subsurface 32 action in the lower, open section of the sump chamber 3. Further elements illustrated include the top 11 and a bottom 12 and top opening 13 of the hydrodynamic separator 10.

Figure 6:
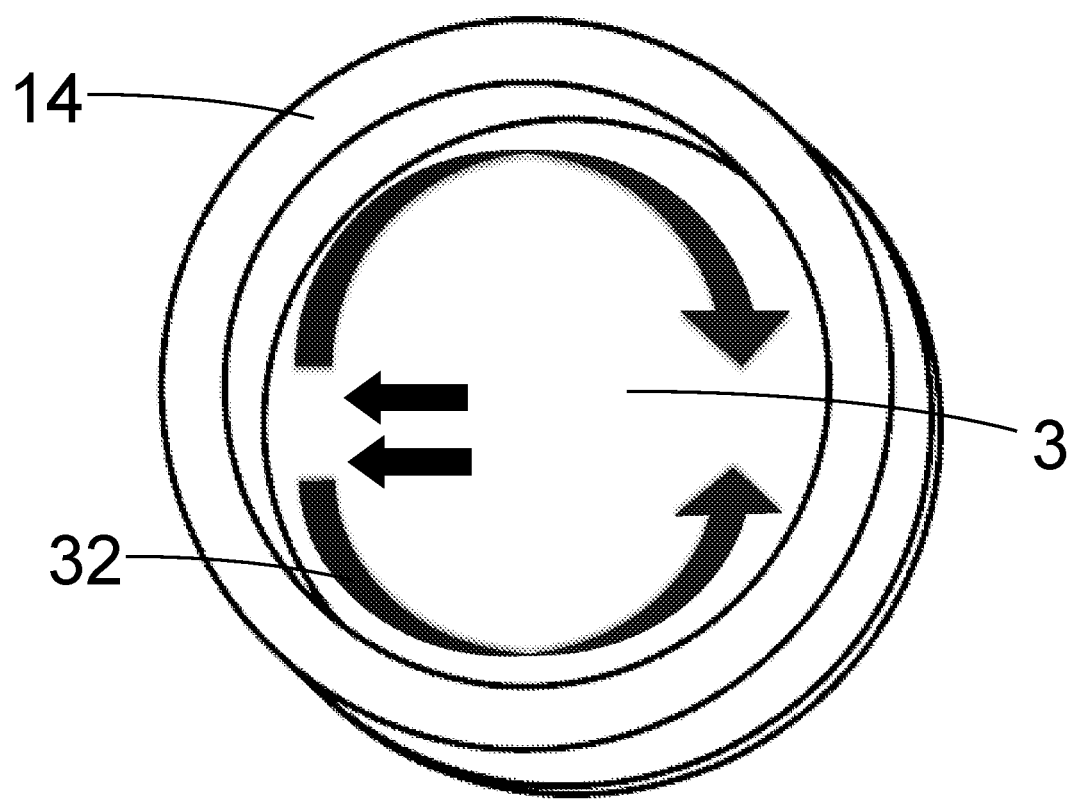
FIG. 6. Illustrates a top-view of the sump chamber in operation showing the flow path at a lower portion of the water column, in accordance with one embodiment.

FIG. 6 demonstrates a top-view of the sump chamber 3 at an elevation below the flow splitter 2, oil-floatables skimmer 4, and the outlet weir 5 (none of which are shown), wherein water that was directed at surface water level back toward the inlet pipe 1 under the flow splitter 2 comes into contact with the walls 14 of the hydrodynamic separator 10 at which point the water velocity hits the wall 14 and the flow path is once again split in two directions along the walls 14 and then flows in two semi-circles toward the outlet pipe 6 (not shown) side of the sump chamber 3 which once again maximizes flow path and allows for more time for sediments to settle to the bottom of the sump chamber 3. This flow path best illustrates the second swirling motion in the subsurface 32.

Figure 7:
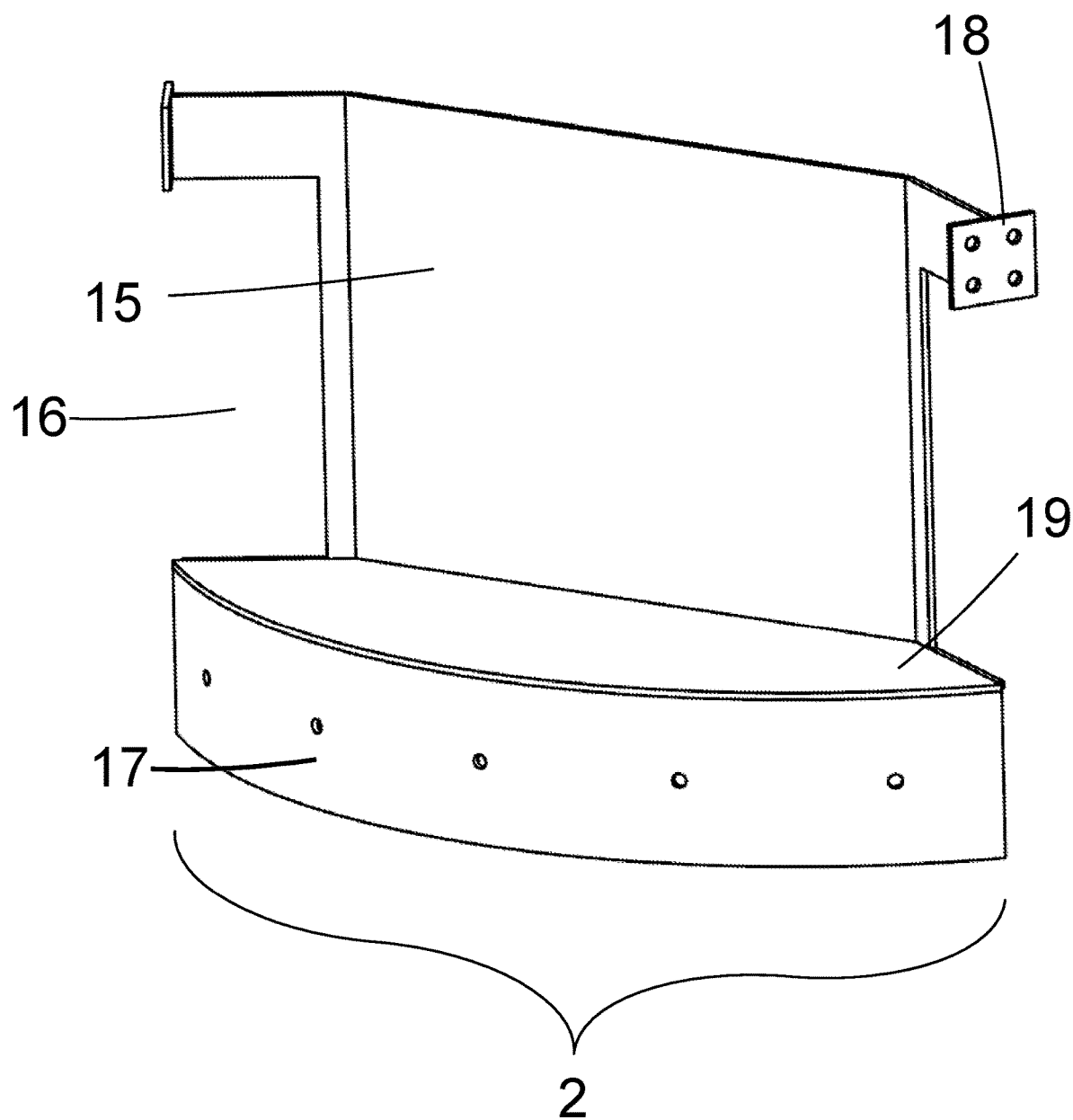
FIG. 7. Illustrates an isometric view of a flow splitter, in accordance with one embodiment.

FIG. 7 presents an embodiment of the flow splitter 2 having two side mounts 18 and bottom mount 17 to be fixed on the walls 14 of the hydrodynamic separator 10 (neither of which are shown). The bottom shelf 19 of the flow splitter is connected to the flow splitter wall 15 which has openings 16 on its ends to allow water to flow out of the flow splitter 2. The flow splitter openings 16 provide a gap between the flow splitter 2 and the hydrodynamic separator walls 14 (not shown) which enables trash and debris to enter the inlet pipe 1 (not shown) side of the sump chamber 3 (not shown), preventing the flow splitter 2 from becoming clogged. The floatable trash, debris and hydrocarbons are caught and retained behind the oil-floatables skimmer (not shown) 4 which prevents these pollutants from leaving the hydrodynamic separator (not shown) 10.

FIG. 8 presents an embodiment of the outlet weir 5 having two side mounts 21 to be removably affixed to the perimeter of the sump chamber 3 walls along with the bottom mount 20. The outlet weir 5 has a shelf 22 extending away from the outlet pipe 6 (not shown) with the opposed end connected to an outlet weir wall 23 that extends up from the shelf 22. The outlet weir 5 may contain an optional set of orifice control holes 24 to control lower flow through the hydrodynamic separator 10.

Figure 9:
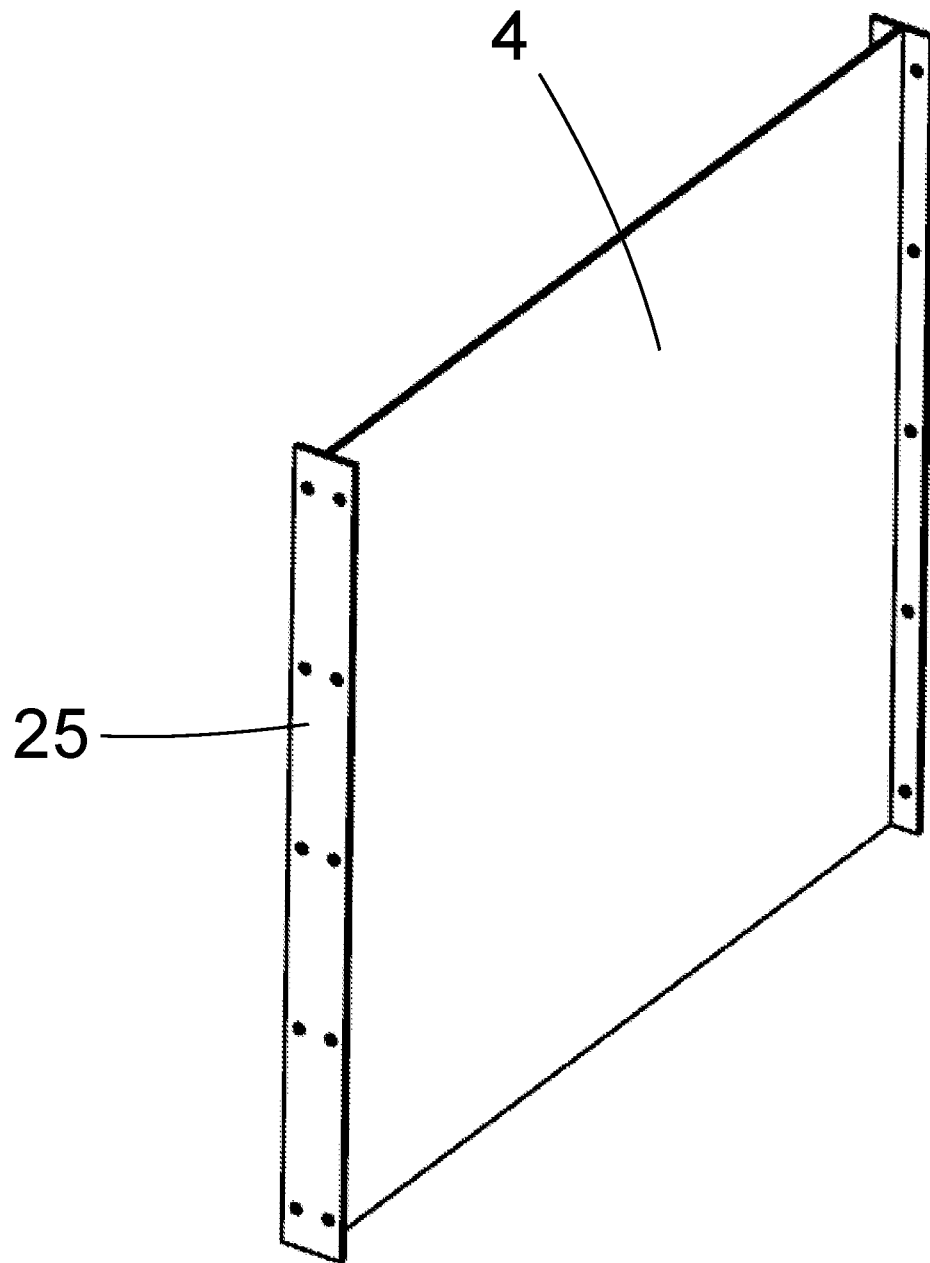
FIG. 9. Illustrates an isometric view of an oil-floatables skimmer, in accordance with one embodiment.

FIG. 9 presents an embodiment of the oil-floatables skimmer 4. The oil-floatables skimmer 4 has a dual function. First it serves as a barrier separating the sump chamber 3 into two sides. The oil-floatables skimmer 4 neither reaches to the top of the hydrodynamic separator 11 (not shown, best seen in FIG. 1) nor the bottom of the hydrodynamic separator 12 (not shown, best seen in FIG. 1). The oil-floatables skimmer 4 may have an approximate thickness of 0.1 inches to 3 feet. The width of the oil-floatables skimmer 4 extends across the full width of the hydrodynamic separator's diameter from wall 14 to opposite wall 14, where it is removably mounted to said walls with side mounts 25. The oil-floatables skimmer 4 is positioned vertically so its bottom extends into the sump chamber below the invert of the outlet pipe 6 and its top extends above the sump chamber 3 (not shown, best seen in FIG. 1).

The oil-floatables skimmer 4, best seen in FIG. 9, also serves as a weir where oils and grease are captured and retained from passing stormwater. Oil and grease removal levels reach up to ninety-nine percent in the present invention.

Figure 10:
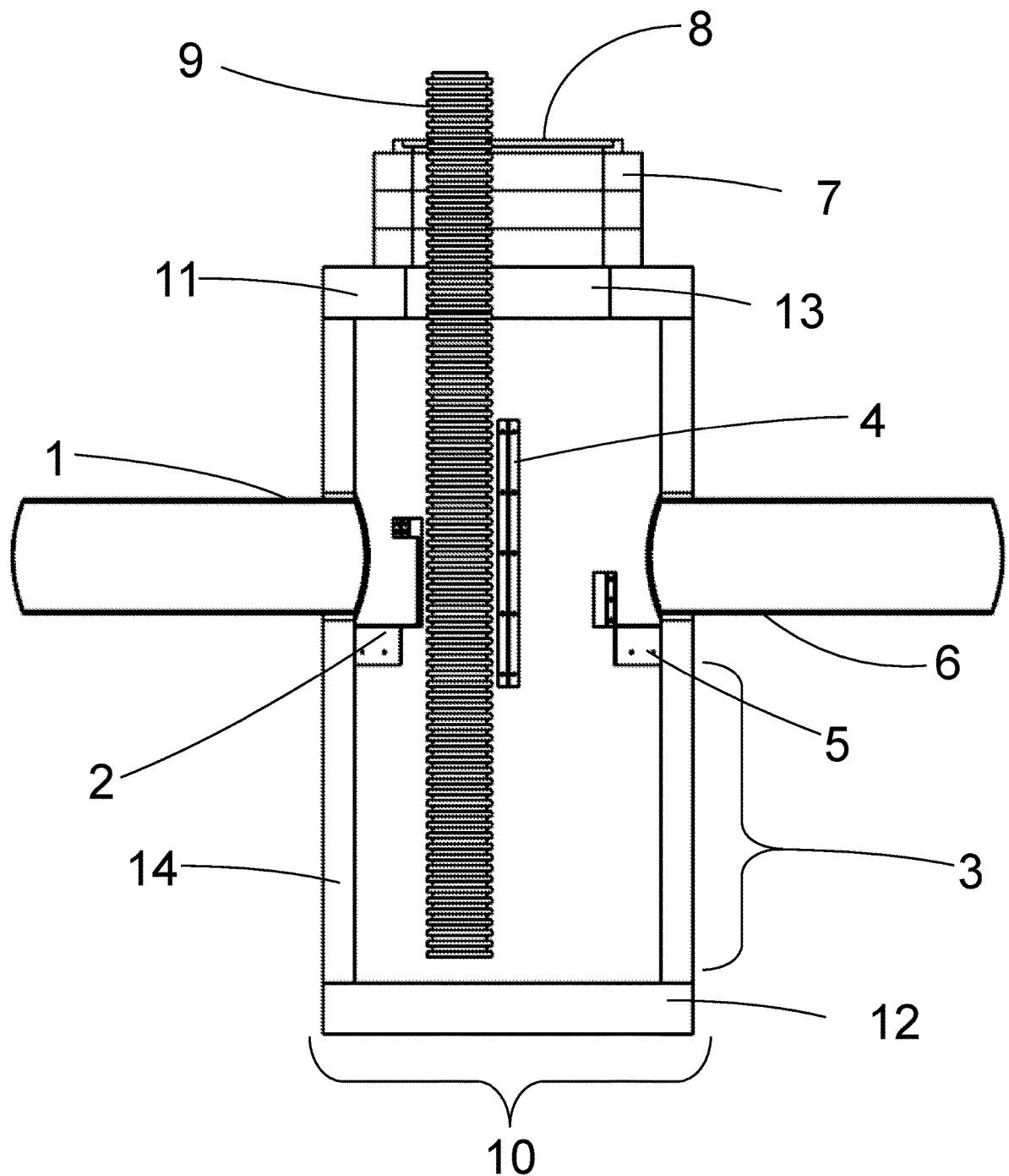
FIG. 10. Illustrates a side-view, cut-out schematic of the sump chamber during cleaning on the inlet side of the hydrodynamic separator, in accordance with one embodiment.

FIG. 10 demonstrates an embodiment of the cleaning of the hydrodynamic separator 10. In this depiction, a vacuum hose 9, is placed in the sump chamber 3 on the inlet pipe 1 side of the oil-floatables skimmer 4 The vacuum hose 9 may be inserted through the manhole cover 8 (not shown, best seen in FIG. 1), via the access riser 7 to remove settled trash and debris from the sump chamber 3 bottom, located above the hydrodynamic separator floor 12. FIG. 10 also demonstrates how the sump chamber 3 has minimal elements, thereby reducing potential obstructions and increasing the efficiency of cleaning and maintaining the hydrodynamic separator 10. Included in this illustration are other elements of the hydrodynamic separator 10 including: a sump chamber 3, an inlet pipe 1, a flow splitter 2, an oil-floatables skimmer 4, an outlet weir 5, an outlet pipe 6, and an access riser 7.

Figure 11:
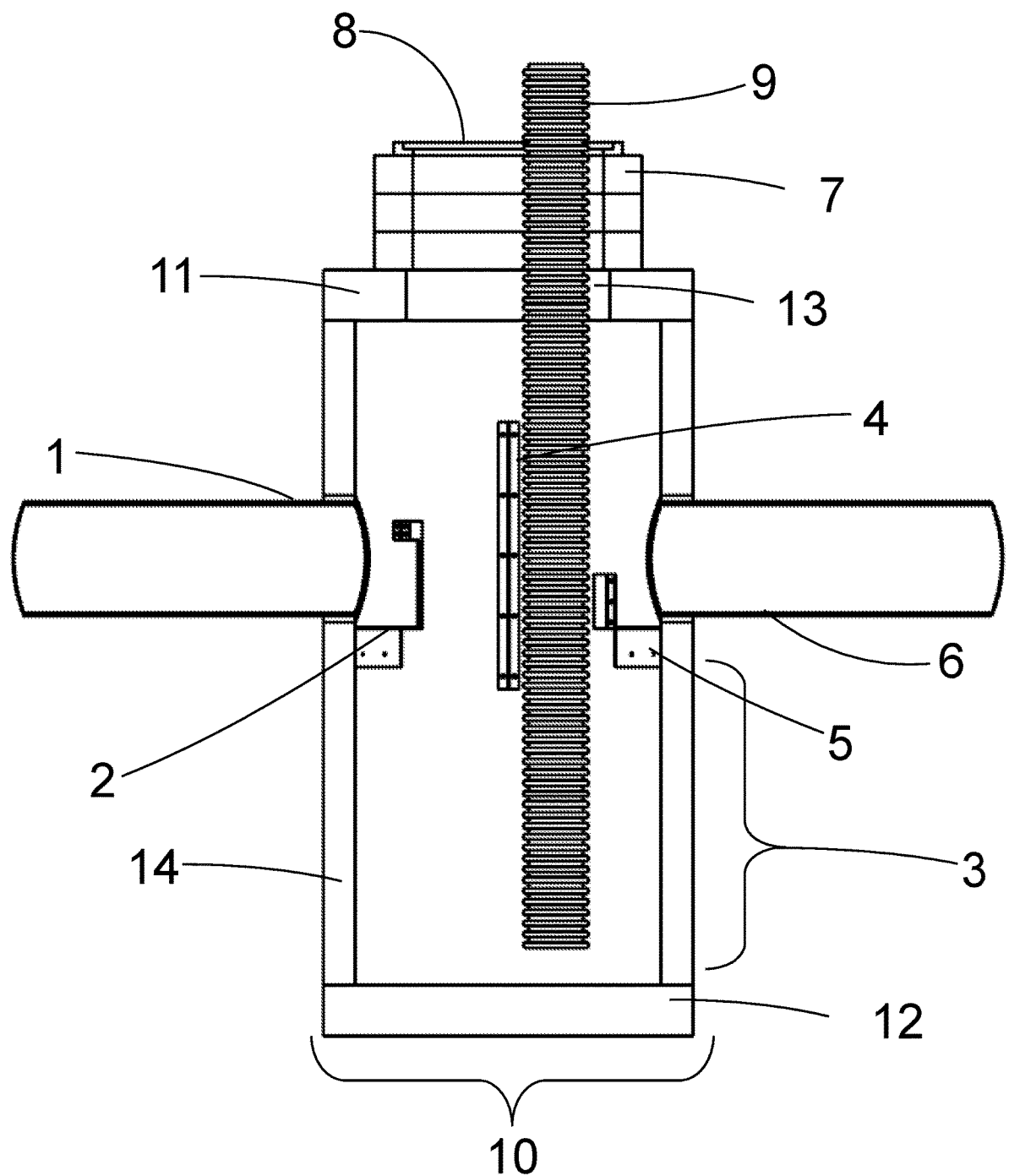
FIG. 11. Illustrates a side-view, cut-out schematic of the sump chamber during cleaning on the outlet side of the hydrodynamic separator, in accordance with one embodiment.

FIG. 11 demonstrates another embodiment of the cleaning of the hydrodynamic separator 10. In this depiction, a vacuum hose 9, is placed on the outlet pipe 6 side of the sump chamber 3. The vacuum hose 9 may be inserted through the manhole cover 8 (not shown, best seen in FIG. 1), via the access riser 7. As with FIG. 10, FIG. 11 demonstrates how the sump chamber 3 has minimal elements, thereby reducing potential obstructions and increasing the efficiency of cleaning and maintaining the hydrodynamic separator 10. Also identified are other elements of the hydrodynamic separator 10 including: a sump chamber 3, an inlet pipe 1, a flow splitter 2, an oil-floatables skimmer 4, an outlet weir 5, an outlet pipe 6, and an access riser 7 and the floor 12 of the hydrodynamic separator 10.

The hydrodynamic separator 10 materials may be selected from a group consisting of: metal, plastic, concrete, fiberglass, composite, or other. The flow splitter 2, oil-floatables skimmers 4 and outlet weir 5 materials may be selected from a group of non-corrosive materials including but not limited to: metal, plastic, concrete, fiberglass, composite, or other.

In an alternate embodiment, more than one inlet pipe(s) 1 may be connected to the hydrodynamic separator 10 to accommodate additional stormwater inflow. Additional inlet pipe(s) 1 are positioned to feed into the same flow splitter 2 or an additional flow splitter 2 could be added.

In another embodiment, more than one outlet pipe(s) 6 may be positioned in line with each other to increase the speed at which stormwater exits the hydrodynamic separator 10. Additional outlet pipe(s) 6 are positioned to feed into the same outlet weir 5 or an additional outlet weir 5 could be added.

Inlet pipe(s) 1 and outlet pipe(s) 6 may have a diameter of approximately 2 inches to approximately 30 feet. The diameter of a preferred embodiment ranges from 6 to 72 inches. Materials for the inlet pipe 1 and outlet pipe 6 may be selected from a group consisting of: metal, plastic, concrete, composite, clay or other.

The above specification, examples, and data provide a complete description of the structure and use of exemplary embodiments. Feature(s) of the different embodiment(s) may be combined in yet another embodiment without departing from the recited claims.

What is claimed is:

1. A hydrodynamic separator assembly configured for installation within a stormwater drainage infrastructure, wherein the hydrodynamic separator has substantially circular walls with a top, with one or more access openings, a bottom, at least one inlet opening and at least one outlet opening, and a sump chamber;
   wherein said hydrodynamic separator, contains three flow weirs each serving a specific function including a flow splitter, an oil-floatables skimmer, and an outlet weir;
   wherein said flow splitter is attached to a wall of said hydrodynamic separator, such that water entering via the inlet pipe encounters the said flow splitter and water flow is split outward along the walls of the hydrodynamic separator,
   wherein directed water travels along said walls toward the oil-floatables skimmer and said directed water is directed toward the center of the hydrodynamic separator and then back toward the flow splitter and continues in two circular motions,
   wherein water must flow towards an oil-floatables skimmer bottom, said oil-floatables skimmer with bottom positioned below the invert of the outlet pipe and top is positioned above the invert of the outlet pipe so that all water must pass under the oil-floatables skimmer bottom and in doing so trap floatables, wherein said water that travels under said oil-floatables skimmer, must travel back upward and pass over the outlet weir to make it to the outlet opening, said outlet weir with horizontal shelf and wall is adjacent to said wall of hydrodynamic separator via mounts, and positioned so that the wall of the outlet weir is disposed across the outlet opening so that water must pass over the said weir wall.

2. The hydrodynamic separator assembly of claim 1, where the interior of the sump chamber is minimally obstructed by internal components and having an open area of greater than 65% the total horizontal area of the structure for the ease of cleaning.

3. The hydrodynamic separator assembly of claim 1, wherein the oil-floatables skimmer contains side mounts for removable mounting of the oil-floatables skimmer across the entire breadth of the sump chamber;
wherein the oil-floatables skimmer is mounted below the hydrodynamic separator top opening and with the mount beginning above installed inlet and outlet pipe inverts, extending below the bottoms of and outlet weir shelves;
wherein the top height of the oil-floatables skimmer is above the hydraulic grade line.

4. The hydrodynamic separator assembly of claim 1, wherein the outlet weir is configured to provide an elongated horizontal plane diversion for treated stormwater to flow over the top;
wherein the outlet weir is comprised of a wall with two side mounts, where the side mounts extend the length of the wall; wherein the wall and side mounts connect seamlessly to a curved weir shelf; wherein said curved weir shelf has one or more outlet weir orifice control holes;
wherein the outlet weir assembly of wall, side mounts, shelf, and orifice control holes are affixed to a curved bottom mount configured to be flush with the invert curve of the inside of the sump chamber below the bottom of an outlet pipe.

5. The hydrodynamic separator assembly of claim 1, wherein casing of the assembly is selected from the group consisting of: metal, plastic, concrete, fiberglass, composite, and a combination thereof.

6. The hydrodynamic separator assembly of claim 1, wherein the flow weirs are selected from a group consisting of: non-corrosive materials including: metal, plastic, concrete, fiberglass, composite, and a combination thereof.

7. The hydrodynamic separator assembly of claim 1, wherein the inlet and outlet pipes are selected from a group consisting of: metal, plastic, concrete, clay, or a combination thereof.

8. The hydrodynamic separator assembly of claim 1, wherein the overall size of the system has a diameter of 2 feet to 100 feet.

9. The hydrodynamic separator assembly of claim 1, wherein the inlet and outlet pipes have a diameter of 2 inches to 30 feet.

10. The hydrodynamic separator assembly of claim 1, wherein the oil-floatables skimmer has a thickness of 0.1 inches to 3 feet.

11. The hydrodynamic separator assembly of claim 1, wherein the flow weirs are selected from a group consisting of: flow splitters, oil-floatables skimmer, and outlet weirs and a combination thereof.

12. A hydrodynamic separator assembly configured for installation within a stormwater drainage infrastructure, wherein the hydrodynamic separator has substantially circular walls with a top, with one or more access openings, a bottom, at least one inlet opening and at least one outlet opening, and a sump chamber;
wherein said hydrodynamic separator, contains two flow weirs each serving a specific function including an oil-floatables skimmer and an outlet weir;
wherein water entering via the inlet pipe is directed into the sump chamber of the hydrodynamic separator and is dispersed,
wherein dispersed water travels toward the oil-floatables skimmer,
wherein water must flow downward towards an oil-floatables skimmer, said oil-floatables skimmer with bottom is positioned below the invert of the outlet pipe and top is positioned above the invert of the outlet pipe so that all water must pass under the oil-floatables skimmer bottom and in doing so trap floatables, said oil-floatables skimmer sides make contact with walls of said hydrodynamic separator,
wherein said water that travels under said oil-floatables skimmer, must travel back upward and pass over the outlet weir to make it to the outlet opening, said outlet weir with horizontal shelf and vertical wall is adjacent to said wall of hydrodynamic separator, and positioned so that the wall of the outlet weir is disposed across the outlet opening so that water must pass over the said weir wall.

13. The hydrodynamic separator assembly of claim 12, where the interior of the sump chamber is minimally obstructed by internal components and having an open area of greater than 65% the total horizontal area of the structure for the ease of cleaning.

14. The hydrodynamic separator assembly of claim 12, wherein the oil-floatables skimmer contains side mounts for mounting of the oil-floatables skimmer across the entire breadth of the sump chamber;
wherein the oil-floatables skimmer is mounted below the hydrodynamic separator top opening and with the mount beginning above installed inlet and outlet pipe inverts, extending below the bottoms of the outlet weir shelves; wherein the top height of the oil-floatables skimmer is above the hydraulic grade line.

15. The hydrodynamic separator assembly of claim 12, wherein casing of the assembly is selected from the group consisting of: metal, plastic, concrete, fiberglass, composite, and a combination thereof.

16. The hydrodynamic separator assembly of claim 12, wherein the flow weirs are selected from a group consisting of: non-corrosive materials including: metal, plastic, concrete, fiberglass, composite, and a combination thereof.

17. The hydrodynamic separator assembly of claim 12, wherein the inlet and outlet pipes are selected from a group consisting of: metal, plastic, concrete, clay, or a combination thereof.

18. The hydrodynamic separator assembly of claim 12, wherein the overall size of the system has a diameter of 2 feet to 100 feet.

19. The hydrodynamic separator assembly of claim 12, wherein the inlet and outlet pipes have a diameter of 2 inches to 30 feet.

20. The hydrodynamic separator assembly of claim 12, wherein the oil-skimmer floatables has a thickness of 0.1 inches to 3 feet.

21. The hydrodynamic separator assembly of claim 12, wherein the flow weirs are selected from a group consisting of: oil-floatables skimmer, and outlet weirs and a combination thereof.

22. A hydrodynamic separator assembly configured for installation within a stormwater drainage infrastructure, wherein the hydrodynamic separator has substantially circular walls with a top, with one or more access openings, a bottom, at least one inlet opening and at least one outlet opening, and a sump chamber;
   wherein said hydrodynamic separator, contains two flow weirs each serving a specific function including a flow splitter with one or more side openings and an outlet weir;
   wherein said flow splitter is attached to a wall of said hydrodynamic separator, such that water entering via the inlet pipe encounters the said flow splitter and water flow is split outward along the walls of the hydrodynamic separator,
   wherein directed water travels along said walls toward the outlet weir,
   wherein said water must pass over the outlet weir to make it to the outlet opening, said outlet weir with horizontal shelf and wall is adjacent to said wall of hydrodynamic separator, and positioned so that the wall of the outlet weir is disposed across the outlet opening so that water must pass over the said weir wall.

23. The hydrodynamic separator assembly of claim 22, where the interior of the sump chamber is minimally obstructed by internal components and having an open area of greater than 65% the total horizontal area of the structure for the ease of cleaning.

24. The hydrodynamic separator assembly of claim 22, wherein casing of the assembly is selected from the group consisting of: metal, plastic, concrete, fiberglass, composite, and a combination thereof.

25. The hydrodynamic separator assembly of claim 22, wherein the flow weirs are selected from a group consisting of: non-corrosive materials including: metal, plastic, concrete, fiberglass, composite, and a combination thereof.

26. The hydrodynamic separator assembly of claim 22, wherein the inlet and outlet pipes are selected from a group consisting of: metal, plastic, concrete, clay, or a combination thereof.

27. The hydrodynamic separator assembly of claim 22, wherein the overall size of the system has a diameter of 2 feet to 100 feet.

28. The hydrodynamic separator assembly of claim 22, wherein the inlet and outlet pipes have a diameter of 2 inches to 30 feet.

29. A hydrodynamic separator assembly configured for installation within a stormwater drainage infrastructure, wherein the hydrodynamic separator has substantially circular walls with a top, with one or more access openings, a bottom, at least one inlet opening and at least one outlet opening, and a sump chamber;
   wherein said hydrodynamic separator, includes an outlet weir;
   wherein said water must pass over the outlet weir to make it to the outlet opening, said outlet weir with horizontal shelf and vertical wall is adjacent to said wall of hydrodynamic separator, and positioned so that the wall of the outlet weir is disposed across the outlet opening so that water must pass over the said weir wall, wherein said outlet weir contains one or more orifice control holes in the horizontal deck and or wall portion.

30. The hydrodynamic separator assembly of claim 29, where the interior of the sump chamber is minimally obstructed by internal components and having an open area of greater than 65% the total horizontal area of the structure for the ease of cleaning.

31. The hydrodynamic separator assembly of claim 29, wherein casing of the assembly is selected from the group consisting of: metal, plastic, concrete, fiberglass, composite, and a combination thereof.

32. The hydrodynamic separator assembly of claim 29, wherein the flow weirs are selected from a group consisting of: non-corrosive materials including: metal, plastic, concrete, fiberglass, composite, and a combination thereof.

33. The hydrodynamic separator assembly of claim 29, wherein the inlet and outlet pipes are selected from a group consisting of: metal, plastic, concrete, clay, or a combination thereof.

34. The hydrodynamic separator assembly of claim 29, wherein the overall size of the system has a diameter of 2 feet to 100 feet.

35. The hydrodynamic separator assembly of claim 29, wherein the inlet and outlet pipes have a diameter of 2 inches to 30 feet.

36. The hydrodynamic separator assembly of claim 29, wherein the oil-skimmer floatables has a thickness of 0.1 inches to 3 feet.

* * * * *